United States Patent
Nishizawa

(10) Patent No.: US 8,139,177 B2
(45) Date of Patent: Mar. 20, 2012

(54) LIQUID CRYSTAL DISPLAY DEVICE

(75) Inventor: Shigeki Nishizawa, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 274 days.

(21) Appl. No.: 12/485,105

(22) Filed: Jun. 16, 2009

(65) Prior Publication Data

US 2009/0316062 A1 Dec. 24, 2009

(30) Foreign Application Priority Data

Jun. 18, 2008 (JP) ................................. 2008-159257

(51) Int. Cl.
*G02F 1/1333* (2006.01)
(52) U.S. Cl. .......................................... 349/58; 349/60
(58) Field of Classification Search .................... 349/58, 349/60

See application file for complete search history.

(56) References Cited

U.S. PATENT DOCUMENTS

| | | | | |
|---|---|---|---|---|
| 2003/0112213 A1* | 6/2003 | Noguchi et al. | ................. | 345/96 |
| 2006/0273304 A1* | 12/2006 | Cok | ................................ | 257/40 |
| 2008/0137004 A1* | 6/2008 | Iwasaki et al. | .................. | 349/64 |
| 2009/0015747 A1* | 1/2009 | Nishizawa et al. | ............. | 349/58 |
| 2009/0103009 A1* | 4/2009 | Ohmi et al. | ..................... | 349/65 |
| 2009/0115933 A1* | 5/2009 | Mimura | ........................... | 349/59 |

FOREIGN PATENT DOCUMENTS

JP 2003-280548 10/2003

* cited by examiner

*Primary Examiner* — David Nelms
*Assistant Examiner* — Sang Nguyen
(74) *Attorney, Agent, or Firm* — Antonelli, Terry, Stout & Kraus, LLP.

(57) ABSTRACT

In a liquid crystal display device having a liquid crystal display panel which includes a first substrate and a second substrate, a back plate is arranged on a first-substrate-side of the liquid crystal display panel, a first polarizer is arranged between the back plate and the first substrate, the first polarizer is adhered to the back plate, a face plate is arranged on a second-substrate-side of the liquid crystal display panel, a second polarizer is arranged between the face plate and the second substrate, and the second polarizer is adhered to the face plate.

11 Claims, 12 Drawing Sheets

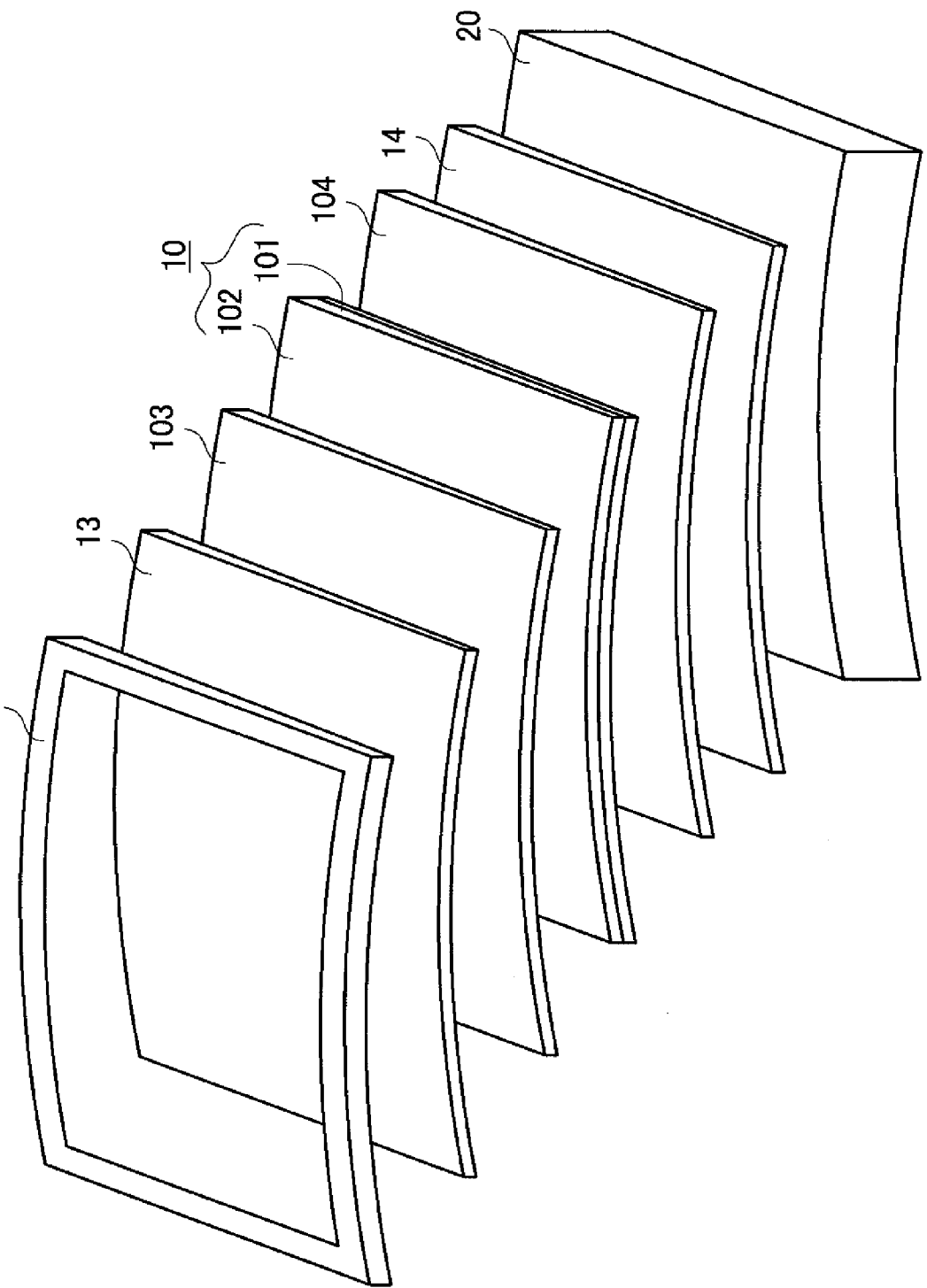

LIQUID CRYSTAL DISPLAY DEVICE

The present application claims priority from Japanese applications JP2008-159257 filed on Jun. 18, 2008, the content of which is hereby incorporated by reference into this application.

BACKGROUND OF THE INVENTION

1. Field of the Invention

The present invention relates to a liquid crystal display device, and more particularly to a liquid crystal display device having a curved display screen.

2. Background Art

Thanks to several favorable characteristics of a liquid crystal display device such as the reduction of thickness of the display device and the reduction of weight of the display device, a demand for a liquid crystal display device has been spreading to various applications ranging from a computer display, a mobile phone display or the like to a television receiver set. Since the liquid crystal display device can reduce a thickness of a liquid crystal display panel thereof, recently, the liquid crystal display device has been also used as a display device having a curved display screen (flexible display).

A liquid crystal display panel can be bent by making a glass substrate of the liquid crystal display panel thin. Such a liquid crystal display panel can be used in various applications including the amusement application such as a slot gaming machine or a pachinko gaming machine or a curved display which is arranged on a circular pillar or the like in a exhibition hall or a station. JP-A-2003-280548 (patent document 1) discloses a technique which makes a glass substrate thin so as to bend the glass substrate and, at the same time, reinforces the glass substrate by adhering a substrate reinforcing layer to the glass substrate. Patent document 1 also discloses the use of a polarizer as the substrate reinforcing layer.

SUMMARY OF THE INVENTION

In a liquid crystal display device disclosed in patent document 1, the substrate reinforcing layer is directly formed on the glass substrate. As an example of such constitution, a polarizer is adhered to the glass substrate as the substrate reinforcing member. However, it is difficult to sufficiently reinforce the glass substrate using only the polarizer. That is, when a liquid crystal display panel disclosed in patent document 1 is arranged on a face frame, there arises a drawback that the liquid crystal display panel projects from a display region of the face frame.

On the other hand, it may be possible to directly arrange a substrate reinforcing layer constituted of a part other than a polarizer on a glass substrate. However, this constitution requires an additional layer between polarizers and hence, there exists a possibility that the polarization direction is changed.

Further, in the liquid crystal display device disclosed in patent document 1, the substrate reinforcing layer is directly adhered to the liquid crystal display panel. Accordingly, the liquid crystal display device has a drawback that when any trouble occurs in a manufacturing process, it is impossible to reproduce the liquid crystal display panel by repairing the liquid crystal display panel.

In general, a liquid crystal display panel is formed by sandwiching a liquid crystal layer between a TFT substrate on which pixels each of which has a TFT (thin film transistor) and a pixel electrode are arranged in a matrix array and a color filter substrate on which color filters are formed. A polarizer is adhered to surfaces of the liquid crystal display panel.

There may be a case where even when the liquid crystal display panel is non-defective before the polarizer is adhered, the liquid crystal display panel becomes defective after the polarizer is adhered. In this case, it is possible to use the liquid crystal display panel as a non-defective product by peeling off the polarizer. However, when the polarizer or the substrate reinforcing layer is strongly adhered to the liquid crystal display panel, the liquid crystal display panel is broken when the polarizer is peeled off from the liquid crystal display panel.

The present invention has been made to overcome the above-mentioned drawbacks, and it is an object of the present invention to provide a liquid crystal display device which can suppress lowering of image quality and can repair the liquid crystal display device while providing a bendable display screen.

The present invention has been made to overcome such a drawback. To describe specific means, they are as follows.

(1) The present invention is directed to a liquid crystal display device which includes a liquid crystal display panel which includes a first substrate, a second substrate, and liquid crystal sandwiched between the first substrate and the second substrate, a face frame which houses the liquid crystal display panel in a state where the face frame covers a peripheral portion of the liquid crystal display panel, and a backlight which is arranged on a side of the liquid crystal display panel opposite to the face frame, wherein the first substrate and the second substrate are formed of a glass substrate, the liquid crystal display panel has a curved surface so as to form a display screen of the liquid crystal display panel into a curved shape, a back plate is arranged on the first substrate side of the liquid crystal display panel, a first polarizer is arranged between the back plate and the first substrate, and the first polarizer is adhered to the back plate, and a face plate is arranged on the second substrate side of the liquid crystal display panel, a second polarizer is arranged between the face plate and the second substrate, and the second polarizer is adhered to the face plate.

(2) The present invention is directed to a liquid crystal display device which includes a liquid crystal display panel which includes a first substrate, a second substrate, and liquid crystal sandwiched between the first substrate and the second substrate, a face frame which houses the liquid crystal display panel in a state where the face frame covers a peripheral portion of the liquid crystal display panel, and a backlight which is arranged on a side of the liquid crystal display panel opposite to the face frame, wherein the first substrate and the second substrate are formed of a glass substrate, the liquid crystal display panel has a curved surface so as to form a display screen of the liquid crystal display panel into a curved shape, a portion of a first polarizer is adhered to the first substrate, and a back plate is arranged on a surface of the first polarizer on a side opposite to the first substrate, and a portion of a second polarizer is adhered to the second substrate, and a face plate is arranged on a surface of the second polarizer on a side opposite to the second substrate.

(3) In the liquid crystal display device having the constitution (1) or (2), the face frame may have a curved surface, and the liquid crystal display panel may be brought into contact with the curved surface of the face frame by way of the face plate.

(4) In the liquid crystal display device having any one of the constitutions (1) to (3), the face plate and the back plate may be made of a light transmitting resin.

(5) In the liquid crystal display device having the constitution (4), a material of the face plate and the back plate may be any one of a polycarbonate resin, an acrylic resin and plastics.

(6) In the liquid crystal display device having any one of the constitutions (1) to (5), the backlight may have a diffusion plate, the diffusion plate may have a curved surface, and the curved surface of the diffusion plate may be aligned with the curved surface of the liquid crystal display panel.

(7) In the liquid crystal display device having the constitution (6), the backlight may have a plurality of optical sheets, the diffusion plate may have a recessed portion on the liquid crystal display side, and the plurality of optical sheets may be arranged in the recessed portion.

(8) In the liquid crystal display device having any one of the constitutions (1) to (5), the backlight may have a light guide plate, a surface of the light guide plate on a liquid crystal display panel side may have a curved surface, and the curved surface of the light guide plate may be aligned with the curved surface of the liquid crystal display panel.

(9) In the liquid crystal display device having any one of the constitutions (1) to (8), the curved surface of the liquid crystal display panel may be formed in an outwardly projecting shape.

(10) In the liquid crystal display device having any one of the constitutions (1) to (8), the curved surface of the liquid crystal display panel is formed in an outwardly recessed shape.

(11) The liquid crystal display device having any one of the constitutions (1) to (10) is characterized in that thin film transistors may be formed on the first substrate and color filters may be formed on the second substrate.

(12) In the liquid crystal display device having any one of the constitutions (1) to (11), assuming a curvature radius of the curved surface of the liquid crystal display panel as R and a total thickness of a thickness of the first substrate and a thickness of the second substrate as t, a relationship of R>400 t may be satisfied.

According to the present invention, in the liquid crystal display device having the curved screen, the liquid crystal display panel is sandwiched between the face plate and the back plate, the upper polarizer is adhered to the face plate, and the lower polarizer is adhered to the back plate and hence, the highly reliable liquid crystal display device can be realized. Further, according to the present invention, when a trouble occurs in the liquid crystal display panel, the liquid crystal display panel is repaired by peeling off the polarizer and hence, the liquid crystal display panel can be reproduced thus lowering a total manufacturing cost.

Further, according to another aspect of the present invention, in the liquid crystal display device having the curved screen, the liquid crystal display panel is sandwiched between the face plate and the back plate, a portion of the upper polarizer is adhered to the color filter substrate, and a portion of the lower polarizer is adhered to the TFT substrate and hence, it is possible to realize the highly reliable liquid crystal display device. Further, according to the present invention, when a trouble occurs in the liquid crystal display panel, the liquid crystal display panel is repaired by peeling off the polarizer and hence, the liquid crystal display panel can be reproduced thus lowering a total manufacturing cost.

BRIEF DESCRIPTION OF THE DRAWINGS

FIG. 3 is an exploded perspective view of a liquid crystal display panel;

DESCRIPTION OF THE PREFERRED EMBODIMENT

The present invention is explained in detail in conjunction with embodiments.

Embodiment 1

Figure 1:
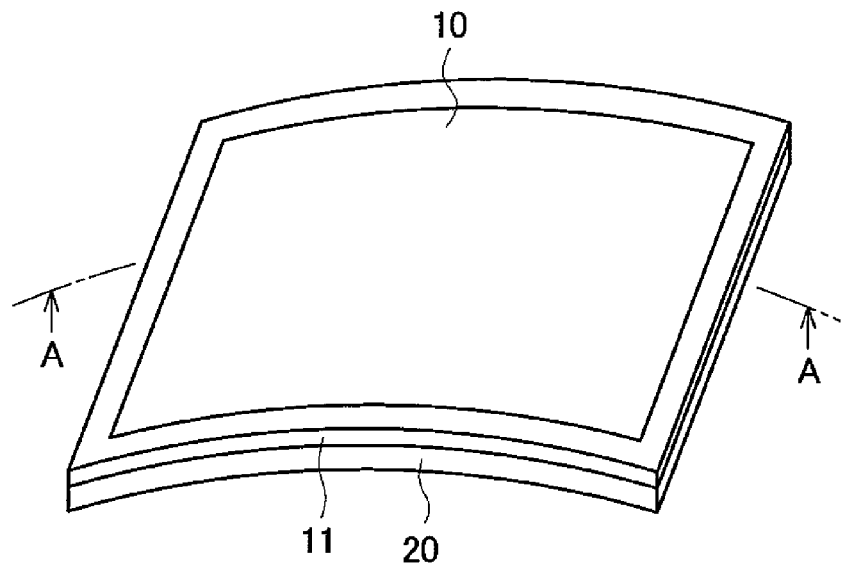
FIG. 1 is an appearance view of a liquid crystal display device of an embodiment 1.

FIG. 1 is an appearance view of a liquid crystal display device of the embodiment 1. FIG. 1 shows a display having an outwardly projecting screen. Such a liquid crystal display device is used for an amusement application, that is, for a slot gaming machine or the like, for example. In FIG. 1, a liquid crystal display panel 10 is outwardly bent. According to this embodiment, in the outwardly-curved liquid crystal display panel 10, a substrate is made of glass. That is, to easily bend the liquid crystal display panel 10, the glass substrate is made thin. The liquid crystal display panel 10 is housed in the face frame 11 having a curved surface thus forming the liquid crystal display panel 10 having a curved screen. Although not shown in FIG. 1, the liquid crystal display panel 10 is covered with a transparent face plate 13 from above. That is, the face plate is arranged between the face frame 11 and the liquid crystal display panel 10.

In FIG. 1, the liquid crystal display panel 10 is covered with a curved face frame 11 except for a display part. A backlight 20 is arranged on a back surface of the liquid crystal display panel 10. The backlight 20 is, as described later, constituted of various optical parts and a light source.

Figure 2A:
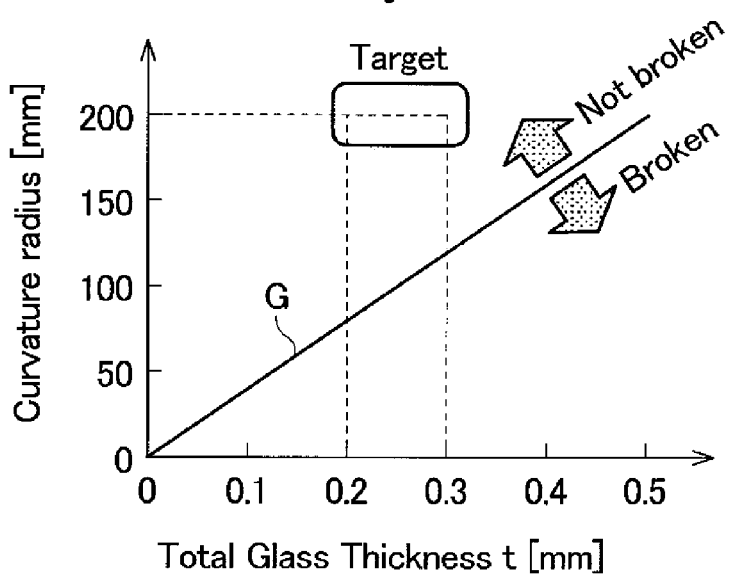
FIG. 2A is a graph showing the relationship between a curvature of a glass substrate and a thickness of the glass substrate.
Figure 2B:
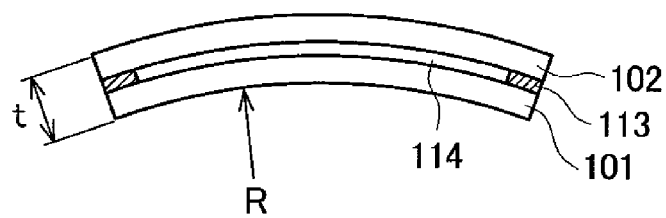
FIG. 2B is a view for explaining parameters used for determining the relationship shown in FIG. 2A.

The formation of the liquid crystal display panel 10 having a curved screen using the glass substrate can use a conventional technique for manufacturing liquid crystal display devices and hence, it is extremely advantageous to enhance the reliability of the liquid crystal display device and the reduction of cost. The degree of bending of the glass substrate is determined based on a thickness of the glass plate. FIG. 2A is a graph showing the relationship between a total glass thickness t of the liquid crystal display panel 10 and a range of the total glass thickness t within which the glass can be bent without being broken. FIG. 2B is a view for explaining parameters used for determining the relationship shown in FIG. 2A. As shown in FIG. 2B, the liquid crystal display panel 10 includes a TFT substrate 101 on which TFTs (thin film transistors) and pixel electrodes are formed, a color filter substrate 102 on which color filters and the like are formed, and liquid crystal which is sandwiched between the TFT substrate 101 and the color filter substrate 102. Further, the liquid crystal is hermetically filled in a space defined between the TFT substrate 101 and the color filter substrate 102 using a sealing material 113.

The glass substrate has a thickness of approximately 0.5 mm to 0.7 mm before the glass substrate is cut into individual liquid crystal display panels having a predetermined size. Accordingly, to form the bendable liquid crystal display panel, after forming the liquid crystal display panel 10, it is necessary to make the liquid crystal display panel thin by grinding an outer side of the glass substrate. The glass substrate is ground by performing mechanical grinding and chemical grinding in combination. In this case, both of the TFT substrate 101 and the color filter substrate 102 are ground. A thickness of a liquid crystal layer 114 is several μm. To compare the thickness of the liquid crystal layer 114 with the thickness of the glass substrate, the thickness of the liquid crystal layer 114 can be ignored. Accordingly, a thickness t shown in FIG. 2B (total thickness of the liquid crystal display panel 10) can be assumed as a total glass thickness t shown in FIG. 2A.

In FIG. 2A, a curvature radius of the liquid crystal display panel 10 is taken on an axis of ordinates. The curvature is, as shown in FIG. 2B, defined as a curvature radius of an inner side of the liquid crystal display panel 10. In FIG. 2A, when a value on the axis of abscissas is 0.2 mm, the total glass thickness t of the liquid crystal display panel 10 is 0.2 mm and hence, the thickness of the TFT substrate 101 or the thickness of the color filter substrate 102 is 0.1 mm.

In FIG. 2A, a straight line G indicates a breaking limit line of the glass substrate. That is, when the relationship between the curvature radius and the total glass thickness is below the straight line G, the glass substrate is broken, while when the relationship between the curvature radius and the total glass thickness is on or above the straight line G, the glass substrate is not broken. Assuming the curvature radius as R and the total glass thickness t of the liquid crystal display panel 10 as t, the relationship of R=400 t is established. That is, when the curvature radius R becomes not more than 400 times as large as the thickness t, the glass substrate is broken. However, in case flaws or the like are formed on the glass substrate, even when the relationship between the curvature radius R and the total glass thickness t is slightly above the straight line G, the glass is broken. Accordingly, it is desirable that an actual product is given the tolerance twice as large as the tolerance of the glass substrate having the relationship between the curvature radius R and the total glass thickness t on the straight line G. That is, it is desirable to use the glass substrate having the relationship between curvature radius R and total glass thickness t which falls on a straight line of R=800 t or in a region above such a straight line. With respect to the product of this embodiment, the relationship between the curvature radius R and the total glass thickness t is set above the straight line G with sufficient tolerance such as in a region indicated by "target" in FIG. 2A.

FIG. 3 is an exploded perspective view of the liquid crystal display device of this embodiment. In FIG. 3, the face frame 11 is formed such that a long side of the face frame 11 is curved. A display screen of the liquid crystal display panel 10 also has a curved surface along the curved surface of the face frame 11. In the face frame 11, first of all, a transparent face plate 13 is housed. The face plate 13 plays a role of protecting the liquid crystal display panel 10 which is arranged below the face plate 13. The face plate 13 is made of a resin such as a polycarbonate resin, an acrylic resin or plastics.

An upper polarizer 103 is arranged below the face plate 13. The upper polarizer 103 is adhered to the face plate 13. The liquid crystal display panel 10 which is constituted of a TFT substrate 101 and a color filter substrate 102 is arranged below the upper polarizer 103. A lower polarizer 104 is arranged below the liquid crystal display panel 10. The lower polarizer 104 is not adhered to the color filter substrate 102.

In a conventional manufacturing method of liquid crystal display devices, when a defect is found in an inspection carried out in a manufacturing process of the liquid crystal display panel 10, there may a case that a polarizer which is once adhered is peeled off so as to reproduce only the liquid crystal display panel 10. However, when the glass substrate is made thin by grinding as in the case of the present invention, there exists a possibility that the TFT substrate 101 or the color filter substrate 102 is broken at the time of peeling off the polarizer. In this case, the liquid crystal display panel 10 can not be reproduced. To obviate such a possibility, in this embodiment, the polarizer is not adhered to the glass substrate.

In this embodiment, instead of adhering the polarizer to the glass substrate, the upper polarizer is adhered to the face plate. Further, the lower polarizer 104 is adhered to a back plate. Both of the face plate and the back plate have a plate thickness of approximately 0.2 mm and are made of plastics or the like and hence, these plates can be easily bent even when the polarizer is adhered to the plates.

A backlight 20 is arranged below the lower polarizer 104. Although not shown in FIG. 3, the backlight 20 is constituted of various optical sheets and light sources.

Further, the backlight 20 may include a light guide plate.

Figure 4:
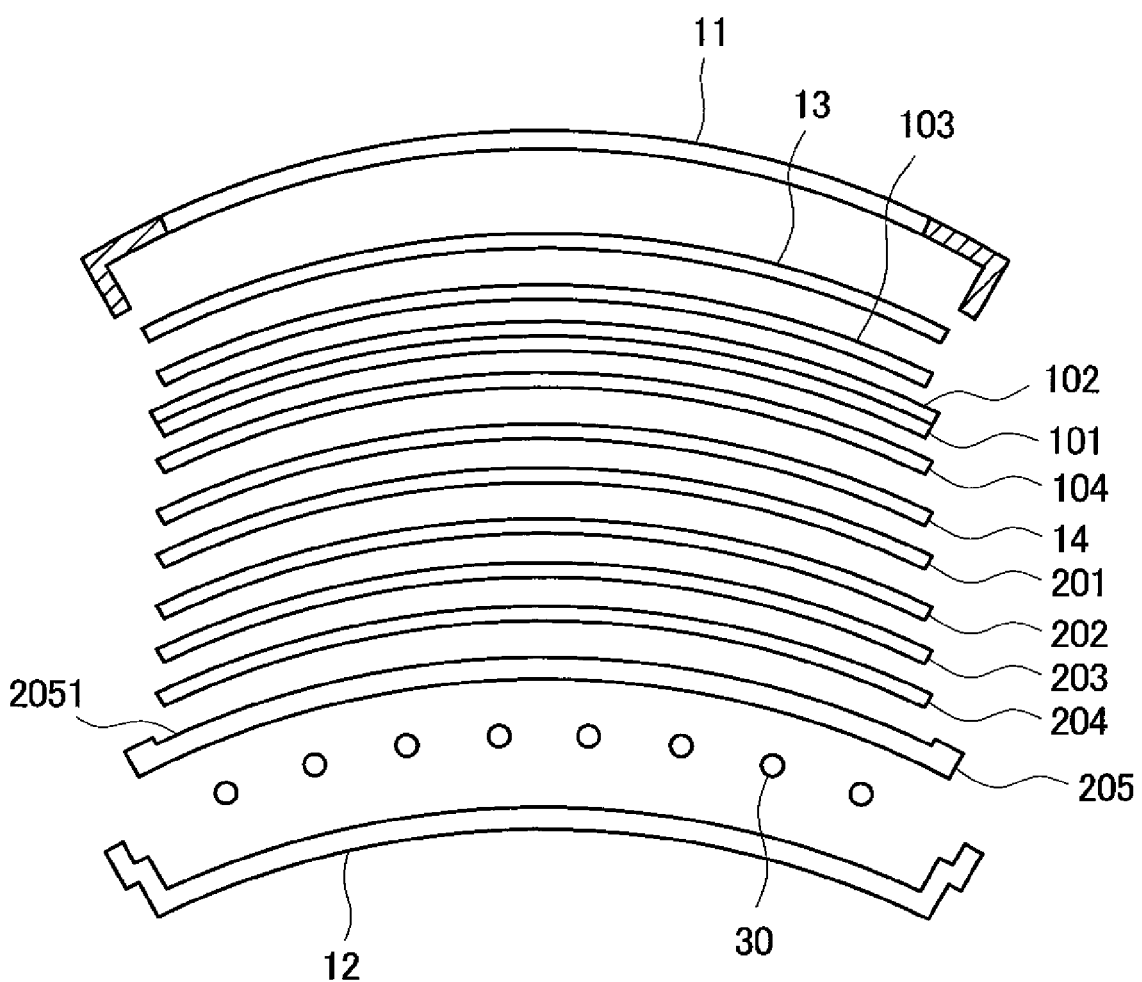
FIG. 4 is an exploded cross-sectional view of the liquid crystal display device.

FIG. 4 is a cross-sectional view taken along a line A-A in FIG. 1. In FIG. 4, due to the curvature of a picture frame portion of the face frame 11, the predetermined curvature is given to a display part of the liquid crystal display panel 10. The transparent face plate 13 is arranged below the face frame 11. The face plate 13 is provided for protecting the liquid crystal display panel 10. Further, in this embodiment, as described previously, the upper polarizer 103 is adhered to the face plate 13.

The glass substrate is ground to an extent that a predetermined curved surface is given to the liquid crystal display panel 10. That is, at a point of time that the liquid crystal display panel 10 is manufactured, the liquid crystal display panel 10 has a planar shape. Then, in installing the liquid crystal display panel 10 in the inside of the face frame 11, a curved surface is given to the liquid crystal display panel 10 thus forming a screen having a predetermined curved surface. The relationship between the total plate thickness of the TFT substrate 101 and the color filter substrate 102 and the curvature radius is above the straight line G shown in FIG. 2A. The lower polarizer 104 is arranged below the liquid crystal display panel 10. The lower polarizer 104 is adhered to the back plate 14.

Figure 5:
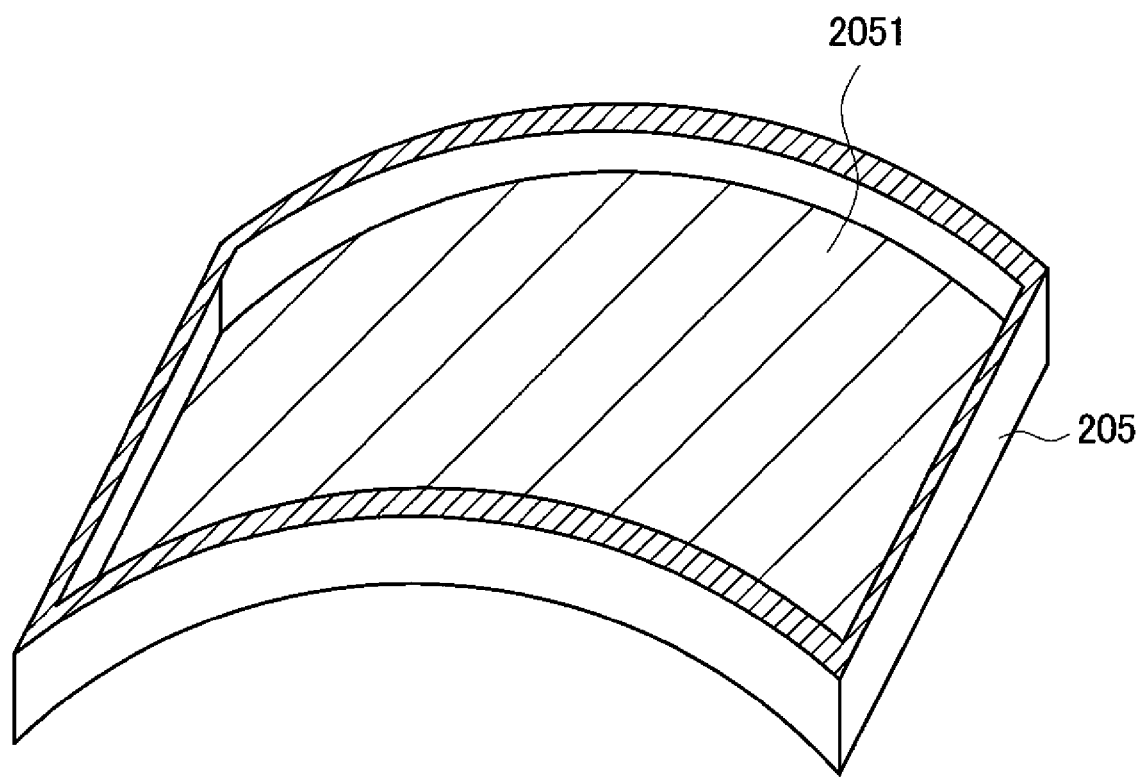
FIG. 5 is a perspective view of a diffusion plate.

In FIG. 4, various optical parts are arranged between a light source and the liquid crystal display panel 10. A light radiated from fluorescent tubes 30 or a light which is reflected on the back frame 12 is, first of all, incident on a diffusion plate 205. The diffusion plate 205 is formed of a polycarbonate plate having a plate thickness of approximately 2 mm and has rigidity to some extent. As shown in FIG. 5, the diffusion plate 205 is formed so as to have the same curvature as the screen of the liquid crystal display panel 10 at the time of molding. Further, a recessed portion 2051 having the same curvature as the screen is formed on the diffusion plate 205. The respective optical sheets are housed in the recessed portion 2051 of the diffusion plate 205 and are bent along a curved surface of the recessed portion 2051 of the diffusion plate 205.

The diffusion plate 205 plays a role of making light from the light source uniform. That is, the diffusion plate 205 prevents a phenomenon that only portions of the display screen corresponding to the fluorescent tubes 30 are brightened so that the brightness of the display screen becomes non-uniform. Since the diffusion plate 205 diffuses light, optical transmissivity of the diffusion plate 205 is sacrificed to some extent. Optical transmissivity of the diffusion plate 205 is set to approximately 70% in this embodiment.

A light emitted from the diffusion plate 205 passes through the lower diffusion sheet 204. The lower diffusion sheet 204 plays a role of making the light emitted from the diffusion plate 205 more uniform. A lower prism sheet 203 is arranged on the lower diffusion sheet 204. For example, a large number of prisms which extend in the lateral direction of the screen are formed on a lower prism sheet 203 at constant pitches. The light which tends to spread in the longitudinal direction of the screen from the backlight 20 is converged in the longitudinal direction of the display screen of the liquid crystal display panel 10.

An upper prism sheet 202 is arranged on the lower prism sheet 203. A large number of prisms which extend in the direction orthogonal to the direction of the prisms formed on the lower prism sheet 203, for example, in the longitudinal direction of the screen are formed on the upper prism sheet 202 at constant pitches. Due to such a constitution, light which tends to spread in the lateral direction of the screen from the backlight 20 is converged in the direction perpendicular to the screen of the liquid crystal display panel 10. In this manner, with the use of the lower prism sheet 203 and the upper prism sheet 202, the light which tends to spread in the longitudinal direction as well as in the lateral direction of the screen can be converged in the direction perpendicular to the screen.

An upper diffusion sheet 201 is arranged on the upper prism sheet 202. Prisms which extend in the fixed direction are formed on the prism sheet at pitches of 50 μm, for example. That is, stripes of contrast are formed at pitches of 50 μm. On the other hand, on the liquid crystal display panel 10, scanning lines are formed in the lateral direction of the screen at fixed pitches and data signal lines are formed in the longitudinal direction of the screen at constant pitches. Accordingly, depending on the pitches of the scanning lines or the pitches of the data signal lines, contrast stripes are formed. As a result, the contrast stripes of the prism and the contrast stripes of the liquid crystal display panel 10 interfere with each other thus generating moiré. The upper diffusion sheet 201 plays a role of reducing the moiré.

The above-explained optical sheets are mounted on the diffusion plate 205. Since the respective optical sheets have small thicknesses ranging from approximately 50 μm to 60 μm, the respective optical sheets exhibit the curvatures substantially equal to the curvature of the diffusion plate 205 by merely mounting the optical sheets on the diffusion plate 205. On the other hand, since the liquid crystal display panel 10 is housed in the frame 11, the liquid crystal display panel 10 exhibits the curvature substantially equal to the curvature of the preliminarily formed curved surface of the frame 11. Further, the liquid crystal display panel 10 is pushed to the face frame 11 by the diffusion plate having a curved surface on which the optical sheets are mounted so that the curved surface is fixed.

Figure 6:
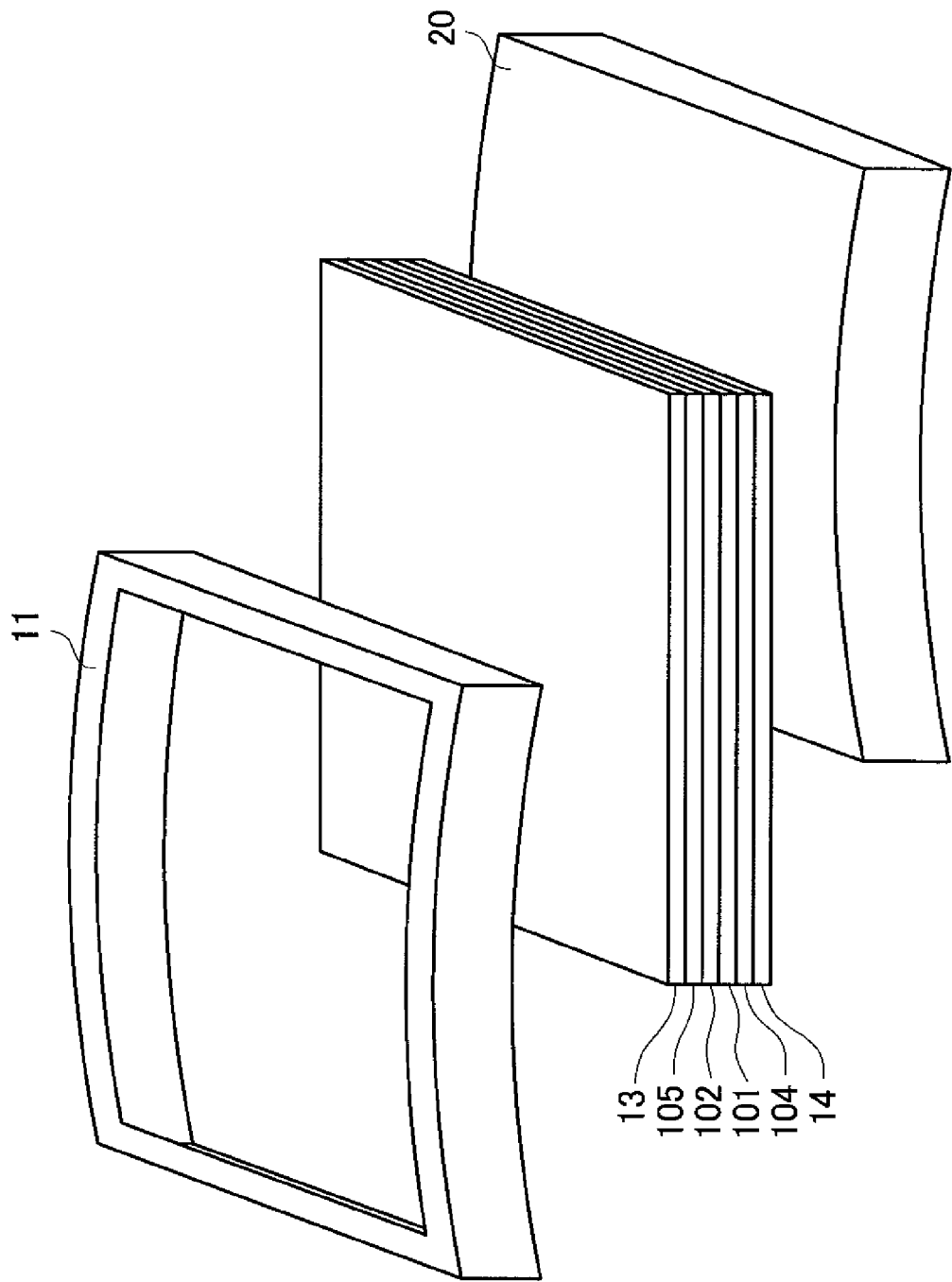
FIG. 6 is a perspective view showing a state where the liquid crystal display panel is sandwiched between a face plate and a back plate.
Figure 7:
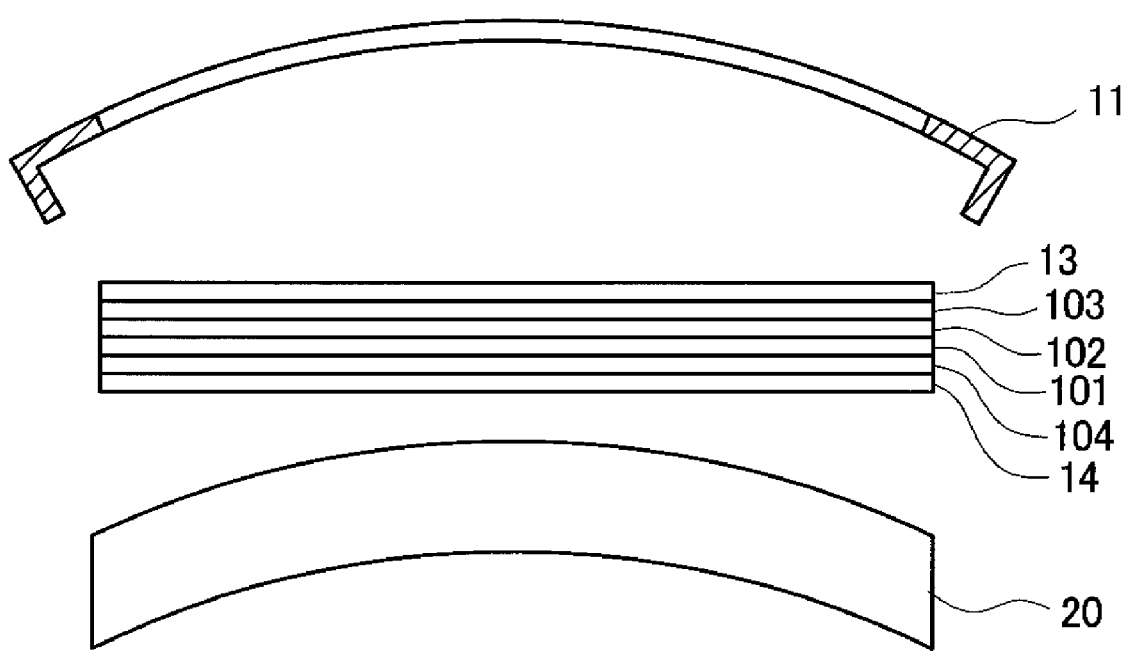
FIG. 7 is a cross-sectional view showing a state where the liquid crystal display panel is sandwiched between the face plate and the back plate.

FIG. 6 is a perspective view showing the face frame 11, the liquid crystal display panel which is sandwiched between the face plate 13 and the back plate 14, and the backlight 20. In FIG. 6, although the liquid crystal display panel has a planar shape in a state shown in the drawing, by sandwiching the liquid crystal display panel between the face frame 11 and the backlight 20 including the diffusion plate and the like, the liquid crystal display panel is formed to have a predetermined curvature. FIG. 7 is a cross-sectional view showing such a state shown in FIG. 6. In FIG. 7, by sandwiching the liquid crystal display panel which includes the TFT substrate 101, the color filter substrate 102, the upper polarizer 103, the lower polarizer 104, the face plate 13 and the back plate 14 between the face frame 11 and the backlight 20, a curved surface of the liquid crystal display panel is determined.

Figure 8:
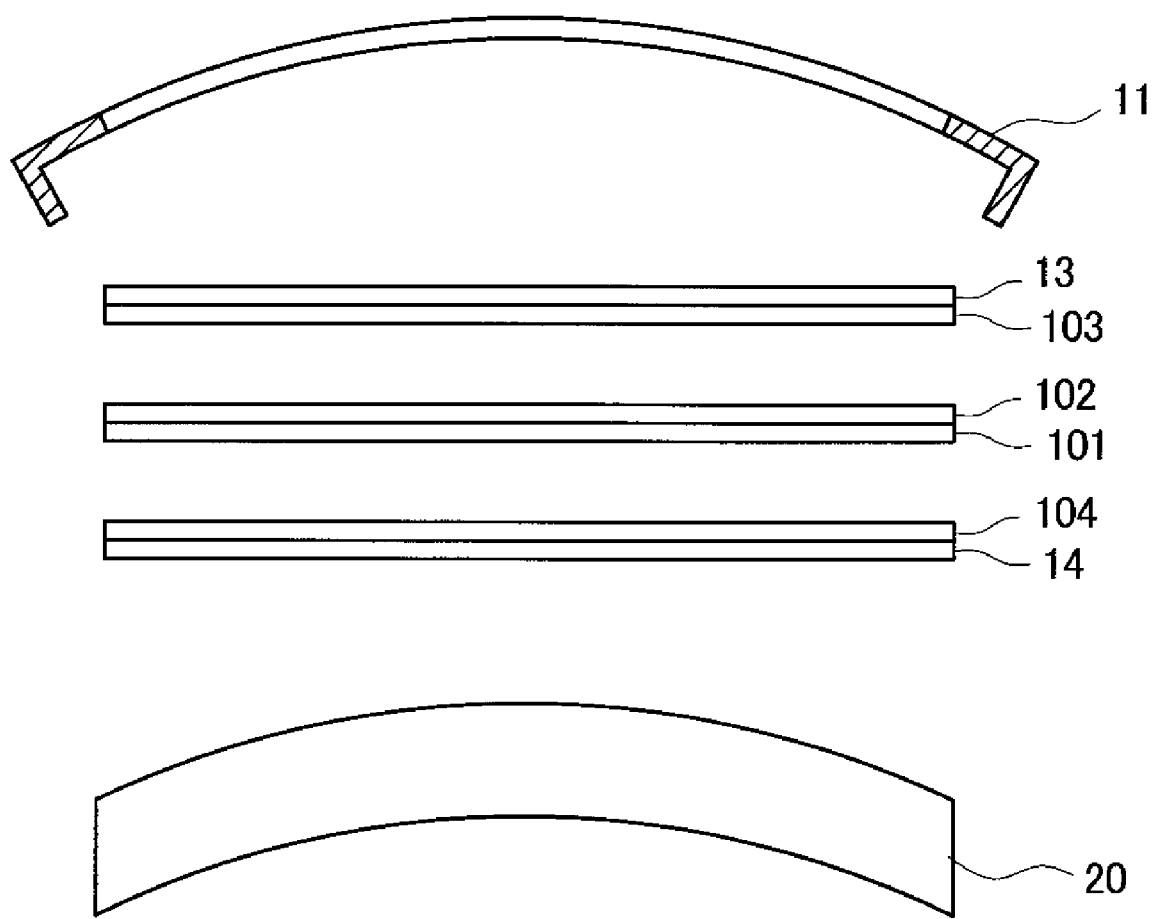
FIG. 8 is a view showing a state where an upper polarizer is adhered to the face plate and a lower polarizer is adhered to the back plate.

FIG. 8 shows the constitution of the liquid crystal display panel before the liquid crystal display panel assumes a state shown in FIG. 7. In FIG. 8, the upper polarizer 103 is adhered to the face plate 13, while the lower polarizer 104 is adhered to the back plate 14. Thereafter, the pair of the face plate 13 and the upper polarizer 103 and the pair of the back plate 14 and the lower polarizer 104 are overlapped with the liquid crystal display panel.

The upper polarizer 103 and the lower polarizer 104 are not adhered to the liquid crystal display panel and hence, even when a defect occurs after adhesion of the polarizers to the plates, the liquid crystal display panel can be reproduced. Further, the upper polarizer 103 is adhered to the face plate 13 and hence, there is no possibility that the polarizer is outwardly projected from the face frame 11. The lower polarizer 104 is stably installed due to the back plate 14.

Figure 9:
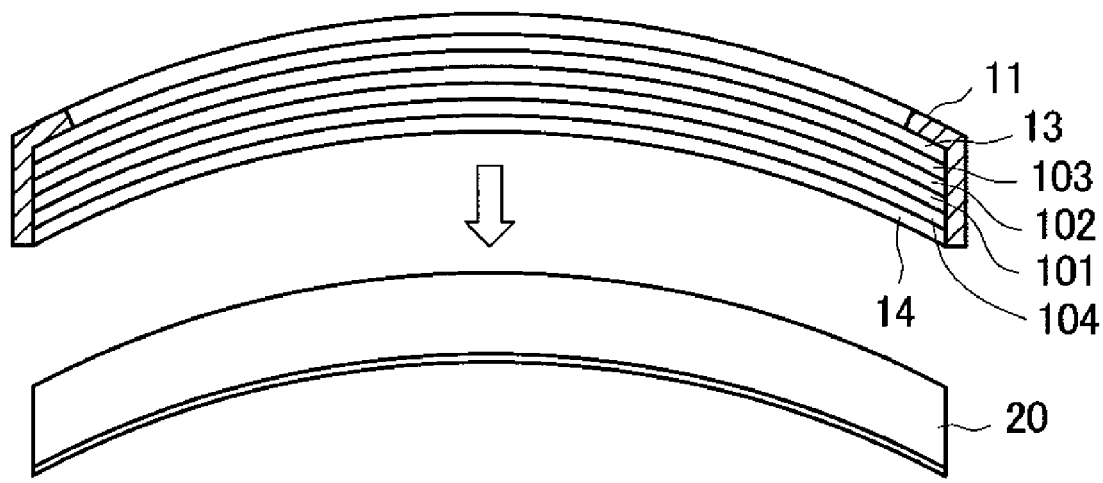
FIG. 9 is a view showing a state where the liquid crystal display panel is arranged along an inner surface of a face frame.

FIG. 9 shows an example of a method of assembling the liquid crystal display panel including the face plate 13 and the back plate 14 formed in the above-mentioned manner into the liquid crystal display device. In FIG. 9, by pushing the liquid crystal display panel into the face frame 11, a curved surface having the same curvature as the face frame 11 is given to the liquid crystal display panel. Thereafter, the backlight 20 including the diffusion plate is pushed to the liquid crystal display panel so as to make the setting of the curvature of the liquid crystal display panel stable. The curvature of the face frame 11 and the curvature of the front surface of the backlight 20 are set equal to each other. The face frame 11 and the backlight 20 are assembled and fixed to each other using hooks or the like not shown in the drawing.

Figure 10:
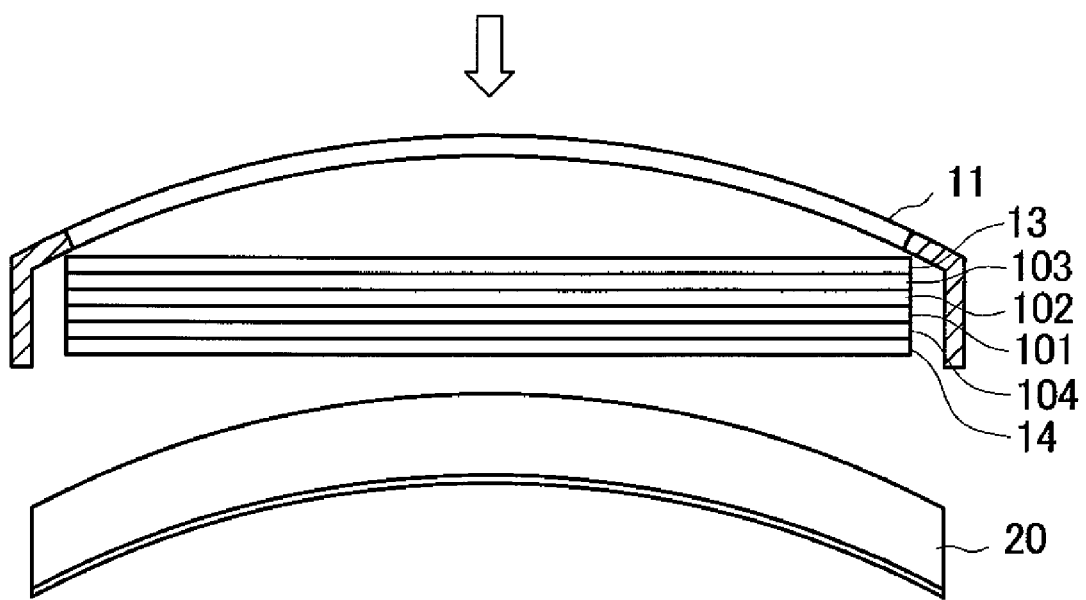
FIG. 10 is a cross-sectional view when a curved surface is given to the liquid crystal display panel using a diffusion plate.

FIG. 10 shows another example of the method of assembling the liquid crystal display panel including the face plate 13 and the back plate 14 into the liquid crystal display device. In FIG. 10, first of all, the liquid crystal display panel is pushed to the backlight 20 to have the same curvature as the backlight 20. Thereafter, the liquid crystal display panel is covered with the face frame 11 so as to determine the curvature of the liquid crystal display panel. The curvature of the face frame 11 and the curvature of the front surface of the backlight 20 are set equal to each other. In the same manner as described above, the face frame 11 and the backlight 20 are assembled and fixed to each other using hooks or the like not shown in the drawing.

Embodiment 2

In the case exemplified in conjunction with the embodiment 1, the polarizer is not adhered to the TFT substrate 101, the color filter substrate 102 and the like of the liquid crystal display panel 10 but is adhered to the face plate 13 and the back plate 14. However, in view of the accuracy of parts and other problems, there may be a case that the assembling accuracy of the liquid crystal display panel 10 and the polarizer cannot be acquired sufficiently. In such a case, when the polarizer is adhered to the glass substrate of the liquid crystal display panel 10 as in the case of the conventional technique, the liquid crystal display panel 10 cannot be reproduced when a defect occurs.

Figure 11:
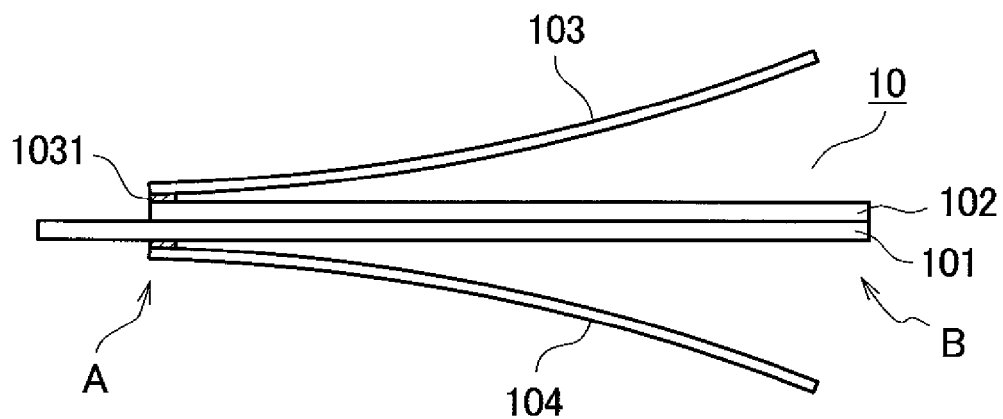
FIG. 11 is a view showing a state where a portion of the upper polarizer and a portion of the lower polarizer are adhered to the liquid crystal display panel.

To cope with such a case, as shown in FIG. 11, by fixing a portion of the upper polarizer 103 or the lower polarizer 104 to the color filter substrate 102 or the TFT substrate 101 by way of an adhesive material or a tacky adhesive material 1031, the polarizer can be stably installed. In such a case, a portion of the liquid crystal panel 10 to which the adhesive material or the tacky adhesive agent 1031 is applied is a portion of the liquid crystal display panel 10 where the TFT substrate 101 and the color filter substrate 102 overlap with each other in a duplicate manner, for example, a portion A or a portion B shown in FIG. 11. Since the duplicate overlapping portion has a high strength, when the polarizer is peeled off at the time of reproducing the liquid crystal display panel 10, it is possible to prevent the liquid crystal display panel 10 from being broken.

Figure 12:
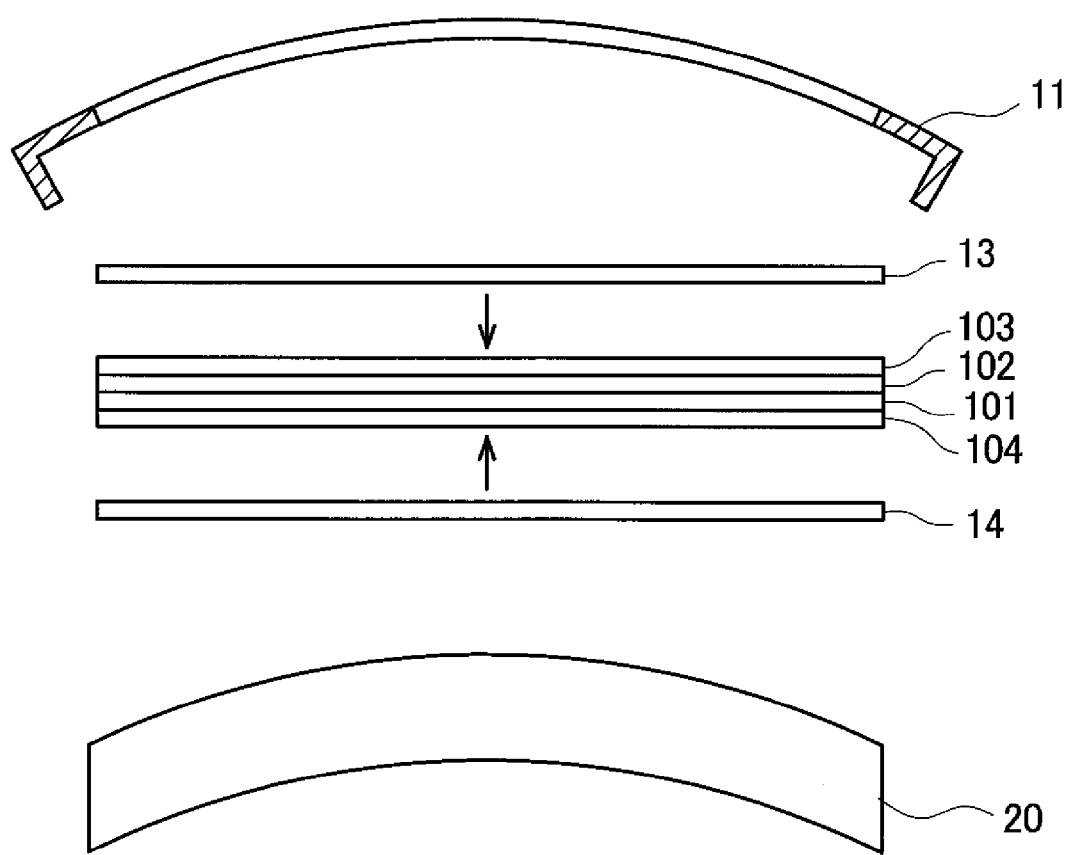
FIG. 12 is an explanatory view for giving a curved surface to the liquid crystal display panel.

FIG. 12 shows a state where the upper polarizer 103 is adhered to the color filter substrate 102 and the lower polarizer 104 is adhered to the TFT substrate 101 as shown in FIG. 11. The face plate 13 is overlapped with the upper polarizer 103, and the back plate 14 is overlapped with the lower polarizer 104. By sandwiching the liquid crystal display panel which is sandwiched between the face plate 13 and the back plate 14 between the face frame 11 and the backlight 20, the liquid crystal display panel can acquire a predetermined curved surface.

Embodiment 3

In the embodiment 1 and the embodiment 2, the explanation is made with respect to a case that the display screen of the liquid crystal display device is outwardly projected. The present invention is also applicable to a case where the display screen is outwardly recessed (inwardly projected). By giving the outwardly recessed or concave shape to the display screen, it is possible to further make use of the characteristics of the liquid crystal display device.

Figure 13:
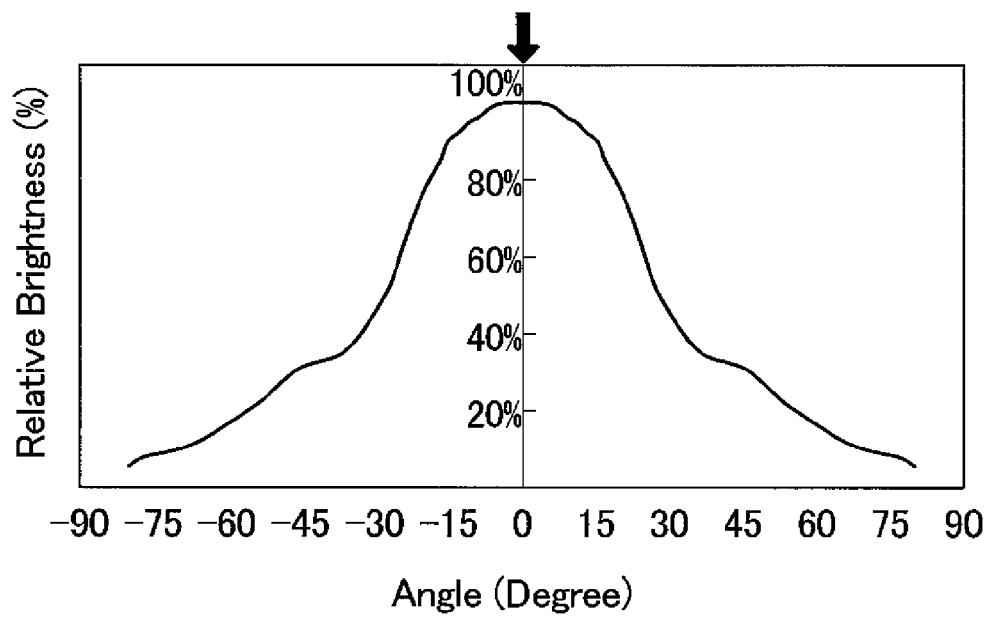
FIG. 13 is a view showing an example of a viewing angle characteristic of the liquid crystal display device.

FIG. 13 shows a viewing angle characteristic of the liquid crystal display device. One of drawbacks which the liquid crystal display device has in image quality is that brightness, chromaticity or the like is changed corresponding to a screen viewing angle. FIG. 13 shows the viewing angle characteristic of a usual TN-type liquid crystal display device. In FIG. 13, relative brightness is taken on an axis of ordinates and brightness when the screen is viewed in the direction perpendicular to the screen is set to 100%. In FIG. 13, a viewing angle is taken on an axis of abscissas. The viewing angle when the display screen is viewed in the normal direction of the display screen is set to 0 degree. As shown in FIG. 13, when the viewing angle is set to 30 degrees, the brightness is decreased to approximately 40%. Further, the reduction of brightness also differs for every color and hence, there also arises a drawback that color is changed corresponding to a viewing angle.

This viewing angle characteristic differs depending on a type of liquid crystal display device. For example, liquid crystal used in IPS (In Plane Switching)-type liquid crystal display panel which controls the transmission of light through liquid crystal by rotating liquid crystal molecules in the direction parallel to the TFT substrate 101 exhibits the excellent viewing angle characteristic compared to liquid crystal used in a usual TN-type liquid crystal display panel. When the display screen is flat or when the display screen is projected outwardly, it is necessary to enhance the viewing angle characteristic of the liquid crystal display device.

Figure 14:
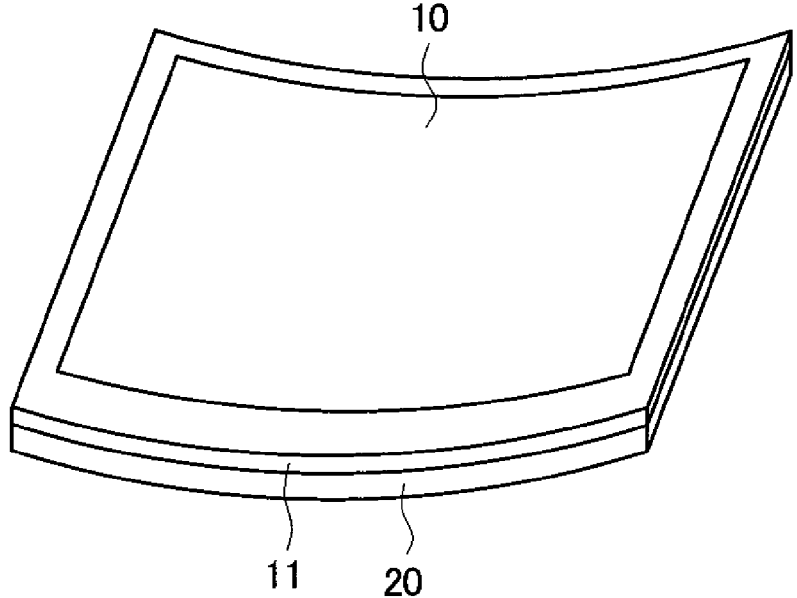
FIG. 14 is an appearance view of a liquid crystal display device of an embodiment 3.

FIG. 14 is an appearance view of the liquid crystal display device according to this embodiment. In FIG. 14, the display screen has an outwardly recessed surface. Accordingly, the display screen shown in FIG. 14 can alleviate the previously-mentioned problem relating to the viewing angle characteristic of the liquid crystal display device. In FIG. 14, except for the constitutional feature that the display screen is outwardly recessed, other constitutional features of this embodiment are equal to the constitutional features of the embodiment shown in FIG. 1. That is, by installing the liquid crystal display panel 10 in a face frame 11 which is outwardly recessed, the liquid crystal display panel 10 is bent to form a screen having a curved surface. In manufacturing the liquid crystal display panel 10 using glass, the relationship between a curvature radius of the liquid crystal display panel 10 and a thickness of the liquid crystal display panel 10 is set substantially equal to the corresponding relationship shown in FIG. 2. Also in this embodiment, in the same manner as the embodiment shown in FIG. 1, a backlight 20 is mounted on a back surface of the liquid crystal display panel 10.

Figure 15:
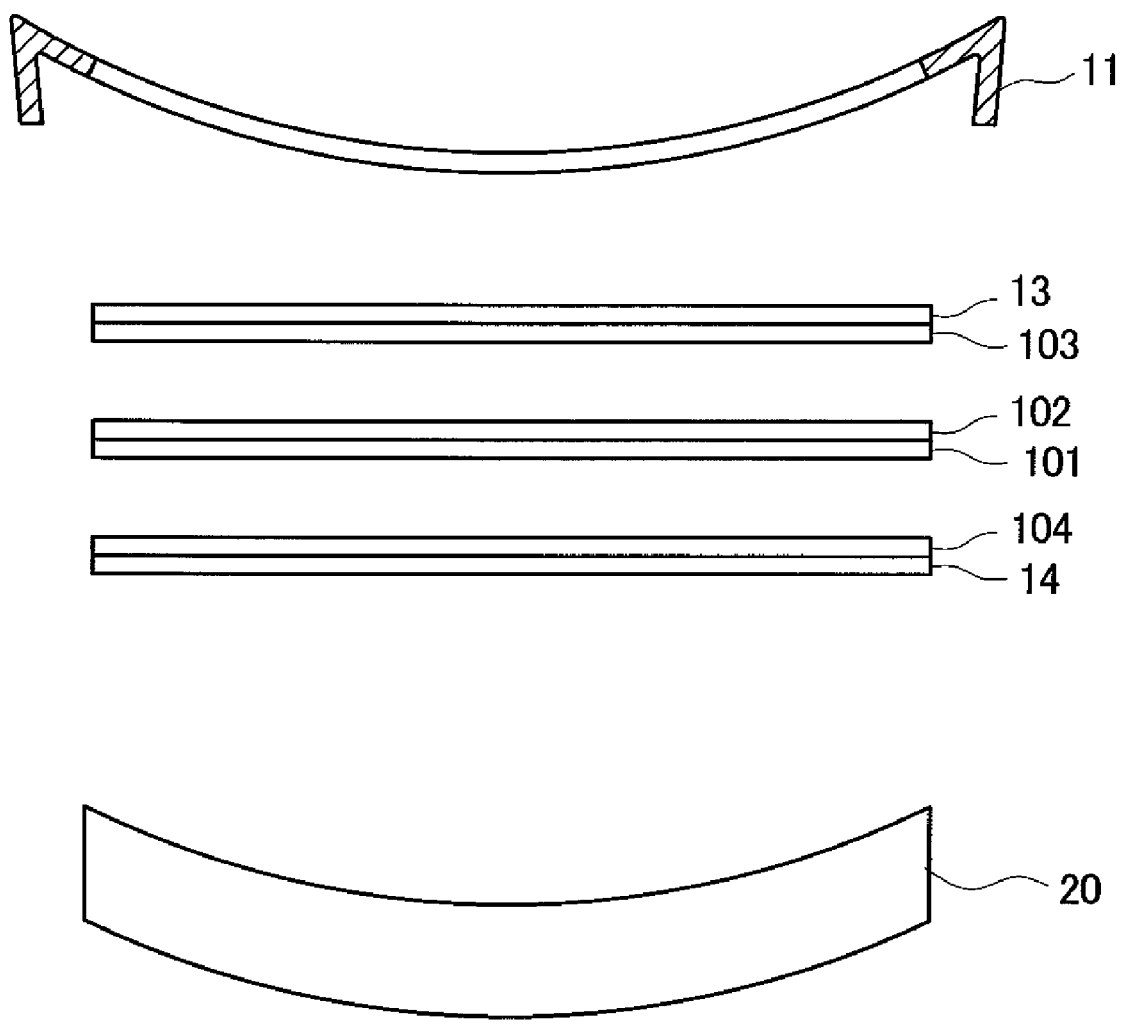
FIG. 15 is a view showing an example of a manufacturing process of the liquid crystal display device of the embodiment 3.

The exploded cross-sectional view of the liquid crystal display device shown in FIG. 15 is substantially equal to the exploded cross-sectional view shown in FIG. 4 except for the constitutional feature that the direction of the curvature is outwardly recessed. Also in this embodiment, by sandwiching the liquid crystal display panel which is sandwiched between the face plate and the back plate between the backlight including the diffusion plate and the like and the face frame, the liquid crystal display panel can acquire a curved surface.

FIG. 15 is an exploded cross-sectional view of the liquid crystal display device showing a state where the upper polarizer 103 is adhered to the face plate 13 and the lower polarizer 104 is adhered to the back plate 14. In FIG. 15, the polarizers are not adhered to the TFT substrate 101 and the color filter substrate 102 respectively and hence, the liquid crystal display panel can be reproduced when a defect occurs in manufacturing process. In FIG. 15, by sandwiching the liquid crystal display panel which is sandwiched between the face plate 13 and the back plate 14 between the face frame 11 and the backlight 20, the liquid crystal display panel can acquire a predetermined curved surface.

Figure 16:
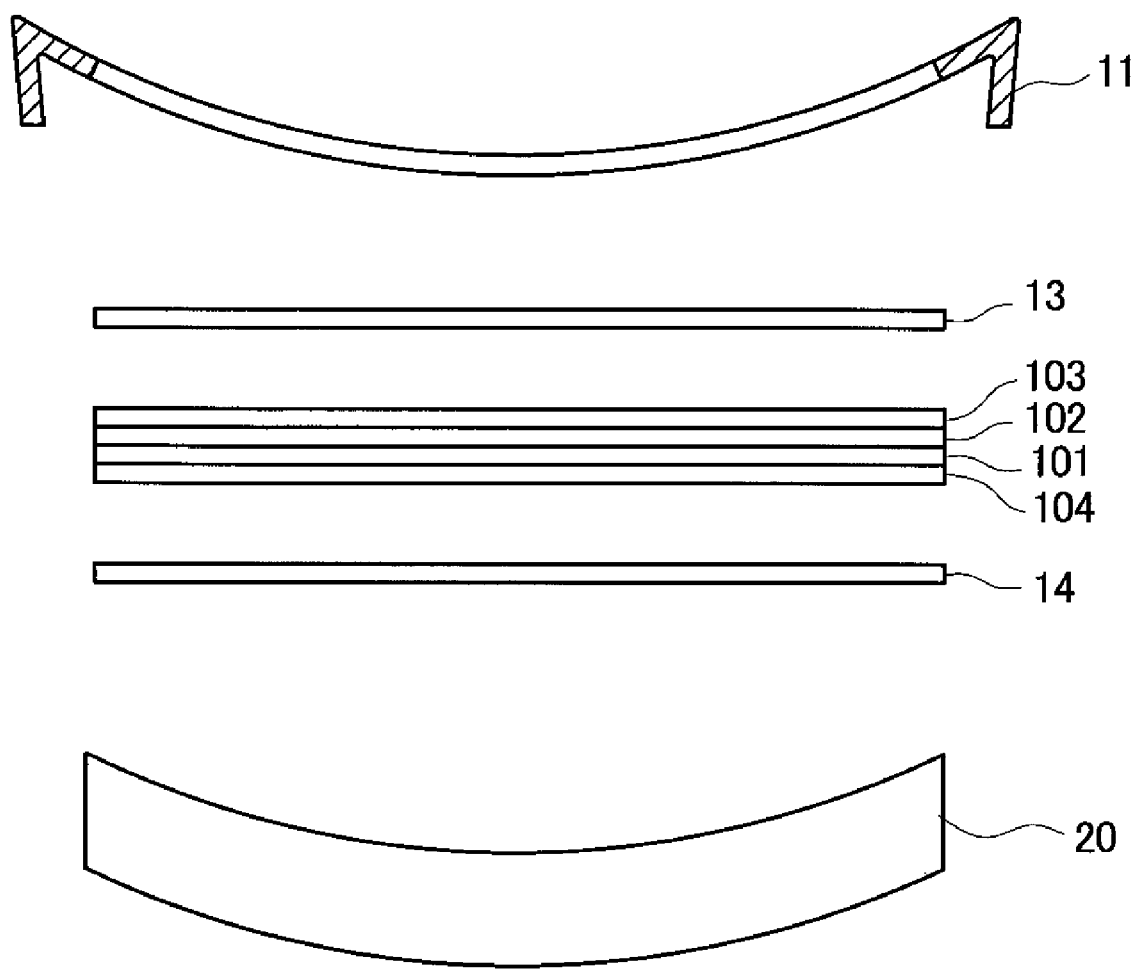
FIG. 16 is a view showing another example of the manufacturing process of the liquid crystal display device of the embodiment 3.

FIG. 16 shows another embodiment of the present invention. In FIG. 16, in the same manner as the embodiment 2, a portion of the upper polarizer 103 is adhered to the color filter substrate 102, and a portion of the lower polarizer 104 is adhered to the TFT substrate 101. Such constitution is substantially equal to the constitution shown in FIG. 11.

Thereafter, the face plate 13 and the back plate 14 are overlapped with the liquid crystal display panel. Then, the liquid crystal display panel is sandwiched between the backlight 20 and the face frame 11 and is pressed by the backlight 20 and the face frame 11 so that a predetermined curvature is given to the liquid crystal display panel.

The manner of setting the curvature of the liquid crystal display panel in FIG. 15 and FIG. 16 is explained. When the screen is outwardly projected as shown in FIG. 9, first of all, the liquid crystal display panel may be pushed to the face frame 11 so as to give a predetermined curvature to liquid crystal display panel and, thereafter, the backlight 20 may be pushed to the liquid crystal display panel so as to determine the given curvature. Further, as shown in FIG. 10, first of all, the liquid crystal display panel may be pushed to a front surface of the backlight 20 so as to give a predetermined curvature to the liquid crystal display panel and, thereafter, the liquid crystal display panel may be inserted into the face frame 11 so as to determine the given curvature.

What is claimed is:

1. A liquid crystal display device comprising:
   a liquid crystal display panel which includes a first substrate, a second substrate, and liquid crystal sandwiched between the first substrate and the second substrate;
   a face frame which houses the liquid crystal display panel in a state where the face frame covers a peripheral portion of the liquid crystal display panel; and
   a backlight which is arranged on a side of the liquid crystal display panel opposite to the face frame, wherein
   the first substrate and the second substrate are formed of a glass substrate,
   the liquid crystal display panel has a main surface which is a display screen,
   the main surface of the liquid crystal display panel being a curved surface,
   a back plate is arranged on the first substrate side of the liquid crystal display panel, a first polarizer is arranged between the back plate and the first substrate,
   the first polarizer is adhered to the back plate and is not adhered to the first substrate,
   a face plate is arranged on the second substrate side of the liquid crystal display panel, a second polarizer is arranged between the face plate and the second substrate, and
   the second polarizer is adhered to the face plate and is not adhered to the second substrate.

2. A liquid crystal display device according to claim 1, wherein the face frame has a curved surface, and the liquid crystal display panel is brought into contact with the curved surface of the face frame by way of the face plate.

3. A liquid crystal display device according to claim 1, wherein the face plate and the back plate are made of a light transmitting resin.

4. A liquid crystal display device according to claim 3, wherein a material of the face plate and the back plate is any one of a polycarbonate resin, an acrylic resin and plastics.

5. A liquid crystal display device according to claim 1, wherein the backlight has a diffusion plate, the diffusion plate has a curved surface, and the curved surface of the diffusion plate is aligned with the curved surface of the liquid crystal display panel.

6. A liquid crystal display device according to claim 5, wherein the backlight has a plurality of optical sheets, the diffusion plate has a recessed portion on the liquid crystal display side, and the plurality of optical sheets are arranged in the recessed portion.

7. A liquid crystal display device according to claim 1, wherein the curved surface of the liquid crystal display panel is formed in an outwardly projecting shape.

8. A liquid crystal display device according to claim 1, wherein the curved surface of the liquid crystal display panel is formed in an outwardly recessed shape.

9. A liquid crystal display device according to claim 1, wherein thin film transistors are formed on the first substrate and color filters are formed on the second substrate.

10. A liquid crystal display device according to claim 1, wherein assuming a curvature radius of the curved surface of the liquid crystal display panel as R and a total thickness of a thickness of the first substrate and a thickness of the second substrate as t, a relationship of $R>400t$ is satisfied.

11. A liquid crystal display device according to claim 1, wherein the first polarizer which is adhered to the back plate and the second polarizer which is adhered to the face plate are disposed so as to enable contact with the liquid crystal display panel without being adhered thereto.

* * * * *